United States Patent [19]

Mery

[11] Patent Number: 5,586,623

[45] Date of Patent: Dec. 24, 1996

[54] REDUCED-BULK BRAKE MOTOR

[75] Inventor: Jean-Claude Mery, Pavillons-Sous-Bois, France

[73] Assignee: AlliedSignal Europe Services Techniques, Drancy, France

[21] Appl. No.: 133,074

[22] PCT Filed: Sep. 22, 1993

[86] PCT No.: PCT/FR93/00918

§ 371 Date: Oct. 12, 1993

§ 102(e) Date: Oct. 12, 1993

[87] PCT Pub. No.: WO94/09285

PCT Pub. Date: Apr. 28, 1994

[30] Foreign Application Priority Data

Oct. 22, 1992 [FR] France ................................. 92 12638

[51] Int. Cl.$^6$ ............................. F16D 65/56; F16D 65/16
[52] U.S. Cl. ........................................ 188/72.6; 188/72.9

[58] Field of Search ...................... 188/71.7, 72.2, 188/72.7, 72.8, 196 M, 196 V

[56] References Cited

U.S. PATENT DOCUMENTS

| 3,404,756 | 10/1968 | Swift | 188/72.6 X |
| 3,638,763 | 2/1972 | Laverdant | 188/72.6 |
| 4,784,245 | 11/1988 | Fabbro et al. | 188/196 M X |
| 5,038,895 | 8/1991 | Evans | 188/72.9 X |
| 5,219,047 | 6/1993 | Fouilleux et al. | 188/72.6 X |

Primary Examiner—Josie Ballato
Attorney, Agent, or Firm—Leo H. McCormick, Jr.

[57] ABSTRACT

A mechanical adjuster for locating a piston within a body of a brake motor. A variable length spacer is located between the piston and a mechanical actuator. The spacer includes an elongated nut and a screw. The elongated nut is rotationally blocked by a pin in the body while the screw is rotated as a function of the linear movement of the piston to maintain a space relationship between friction members and a rotor.

2 Claims, 2 Drawing Sheets

REDUCED-BULK BRAKE MOTOR

The present invention relates to a brake motor comprising: an essentially cylindrical body filled with a hydraulic fluid subjected to a variable pressure; a mechanical actuator comprising a control member which can be accessed from outside this body; a brake piston shutting off the body in leaktight fashion and capable of sliding therein under the effect of the actuator in order to actuate, in turn, at least one friction member; and an automatic adjustment device arranged inside the body between the mechanical actuator and the piston in order to take up the play resulting from the wear of the friction member, this device itself comprising a rotationally fixed elongate nut a first of whose two ends receives a selectively rotary screw which is engaged therein by a first of its two ends, the second end of the nut being capable of receiving a thrust from the mechanical actuator, and the second end of the screw passing through the piston in leaktight fashion in order to be subjected to atmospheric pressure and having a tapered shoulder capable of being selectively rotationally blocked by an internal tapered surface of the piston, rotationally fixed, against which this shoulder is pressed with a force which increases with the pressure of the hydraulic fluid.

BACKGROUND OF THE INVENTION

A brake motor of this type is, for example, known in the prior art from the document EP-A-0,249,522, and is particularly illustrated by FIG. 4 of this document.

Moreover, document FR-A-2 638 214 discloses a brake motor comprising: an essentially cylindrical body filled with a hydraulic fluid subjected to a variable pressure; a mechanical actuator comprising a control member which can be accessed from outside this body; a brake piston shutting off the body in leaktight fashion and capable of sliding therein under the effect of the actuator in order to actuate, in turn, at least one friction member; and an automatic adjustment device arranged inside the body between the mechanical actuator and the piston in order to take up the play resulting from the wear of the friction member, this device itself comprising a selectively rotatable nut in which a rotationally fixed screw is engaged, one end of the screw being capable of receiving a thrust from the mechanical actuator, and the other end of the screw passing through the piston in leaktight fashion in order to be subjected to atmospheric pressure, one end of the nut having a tapered shoulder capable of being selectively rotationally blocked by an internal tapered surface of the piston, rotationally fixed, against which this shoulder is pressed with a force which increases with the pressure of the hydraulic fluid, the mechanical actuator being of the type of actuators which comprise two plates capable of relative rotation, one plate being securely fastened to one end of the screw, and the other plate being fastened to a spindle passing through the body in leaktight fashion.

The design of brake motors, regardless of their structure, their bulk and their functional specifications, permanently seeks to reduce the number of components, simplify the manufacture, reduce the bulk and increase, if still possible, the reliability of these devices, which are mass produced.

SUMMARY OF THE INVENTION

The invention is located within this context and proposes a very compact, highly reliable brake motor of very simple construction, production essentially characterised in that the mechanical actuator is of the type of those which comprise two plates capable of relative rotation, in that the first plate is securely fastened to the second end of the elongate nut, and in that the second plate is connected to a spindle passing through the body in leaktight fashion.

By virtue of this design, the elongate nut and the first plate together form a single dual-function component and the mechanical actuator, immersed in the hydraulic fluid, is both lubricated and protected from the effects of external contamination.

According to a very advantageous feature of the invention, the spindle of the second plate is hollow, and the elongate nut and the first plate, on the one hand, and the second plate and its spindle, on the other hand, are obtained by the same manufacturing method, which makes it possible to further simplify the manufacture of this brake motor.

Other features and advantages of the invention will emerge clearly from the description given hereafter, by way of indication and in no way limiting, with reference to the two appended figures representing, in section, two very similar variants of the invention.

DETAILED DESCRIPTION OF THE INVENTION

The invention relates to a brake motor comprising an essentially cylindrical body 1 filled with a brake fluid subjected to a variable pressure and integral with a caliper 2.

Figure 2:
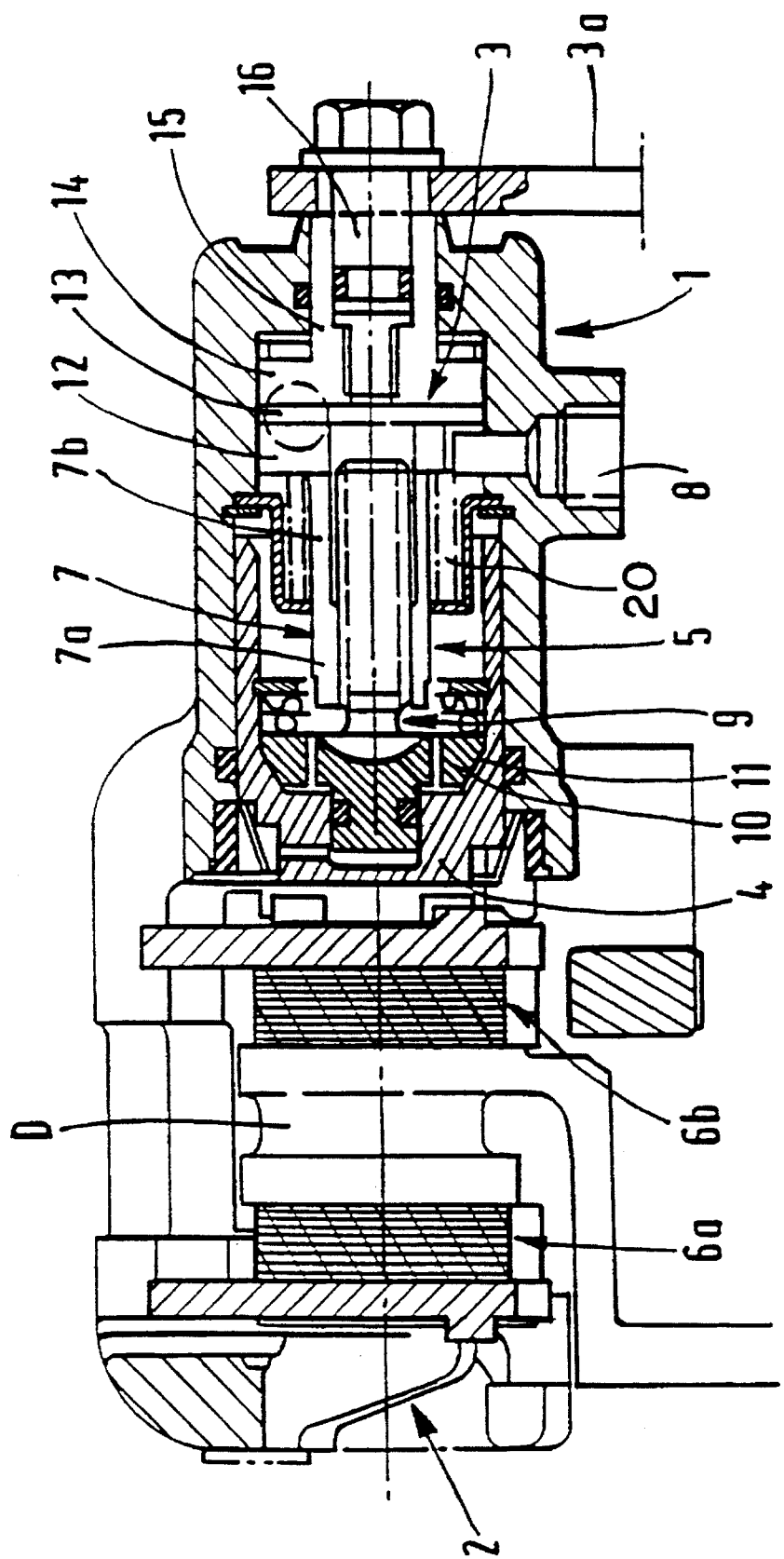
FIG. 2 is a sectional view of another embodiment of the brake motor of FIG. 1.

A mechanical actuator 3, comprising a rotary control lever 3a accessible from outside the body 1, is A brake piston 4 is slidably mounted in the body 1 which it shuts off in leaktight fashion, the displacement of this piston being controlled by the actuator 3 via a spacer 5 of variable length, and allowing two friction members 6a, 6b one of which is held by the caliper 2 and the other pushed by piston 4 to be applied to a rotary disk D (FIG. 2).

The spacer 5, which forms part of an automatic adjustment device intended to take up the play resulting from the wear of the friction members, comprises, on the one hand, an elongate nut 7 rotationally blocked by a pin 8 securely fastened to the body 1 and, on the other hand, a screw 9, the first end 9a of this screw being engaged on the first end 7a of the nut.

The second end 9b of the screw passes through the piston 4 in leaktight fashion and is subjected to atmospheric pressure. The second end 9b and has a tapered shoulder 10 capable of pressing against an internal tapered surface 11 of the piston 4.

The elongate nut 7 and the screw 9 are stressed by springs 20 and 22 in a direction suitable for unscrewing them from one another and for correlatively increasing the length of the spacer 5 which they together constitute, the force of these springs being applied to the screw 9 by means of a rolling bearing bush to allow, when the pressure of the brake fluid increases, a rotation of the screw as far as the position in which the tapered shoulder 10 is rotationally blocked by the internal surface 11 of the piston 4.

According to the invention, the mechanical actuator 3 is of the type with a rotary cam plate and with balls, known per se, and comprises a first plate 12 arranged at the second end 7b of the elongate nut 7 and forming a single component with it, balls such as 13, and a second plate 14 connected to a spindle 15 passing through the body in leaktight fashion and engaging on the control lever 3a, a rolling bearing bush being arranged between the body 1 and the second plate 14 in order to allow the easy rotation of the latter.

Furthermore, the spindle 15 of the second plate 14 is very preferably hollow, so that the first plate 12 and the nut 7, on the one hand, and the second plate 14 and the spindle 15, on the other hand, may be produced from identical components, produced by the same manufacturing method such as molding, extrusion, and/or drawing.

Figure 1:
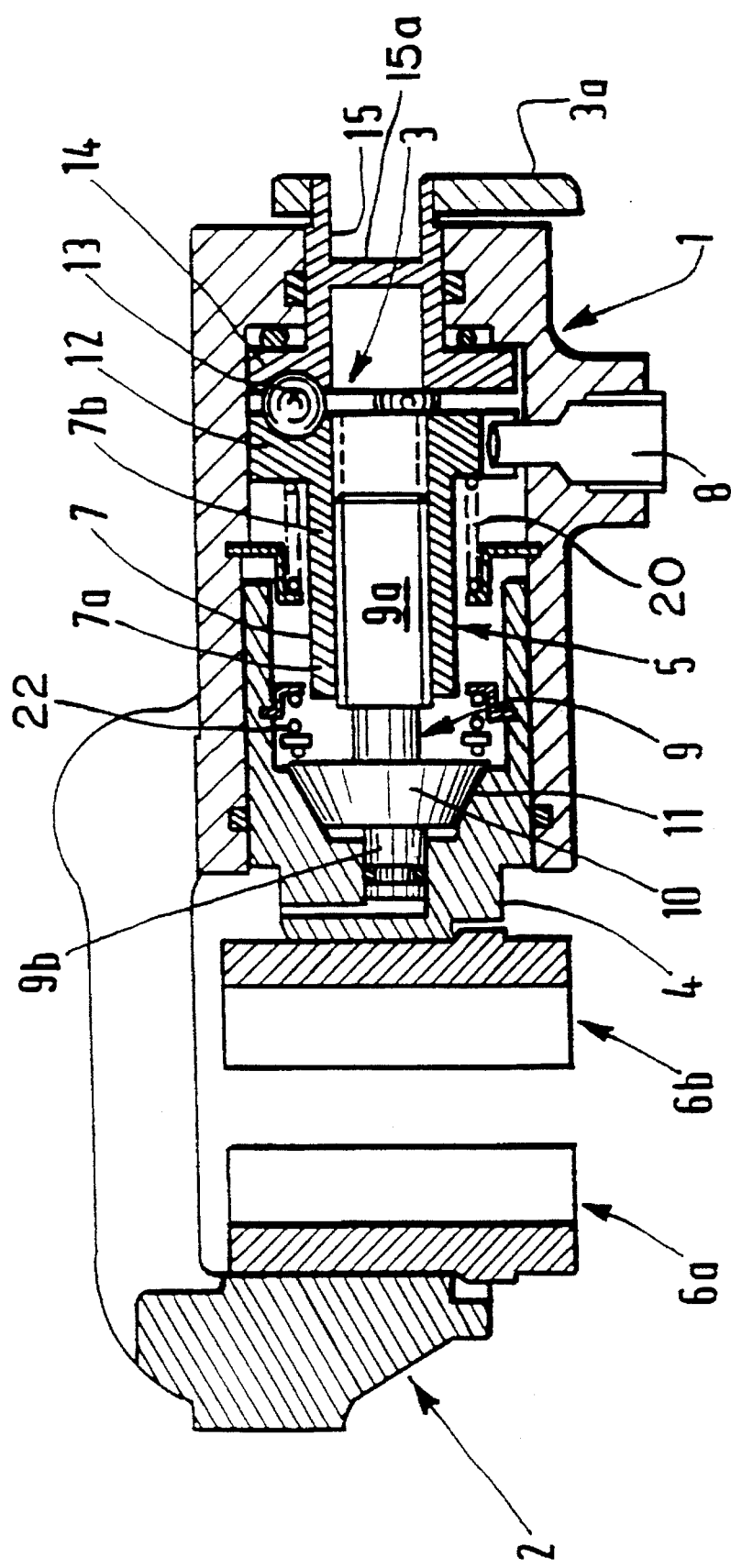
FIG. 1 is a sectional view of a brake motor made according to the principals of this invention.

The spindle 15 may, as shown in FIG. 1, be closed by an axial partition 15a or, as shown in FIG. 2, by a screw 16 which serves to securely fasten it to the control lever 3a.

I claim:

1. A brake motor comprising: an essentially cylindrical body filled with a hydraulic fluid subjected to a variable pressure; a mechanical actuator comprising a control member which can be accessed from outside the body; a brake piston closing off the body in leaktight fashion and capable of sliding therein under the effect of the actuator in order to actuate at least one friction member; and an automatic adjustment device arranged inside the body between the mechanical actuator and the piston to take up the play resulting from wear of the friction member, the device comprising: a rotationally fixed elongate nut, a first end of which receives a selectively rotary screw engaged therein by a first screw end, a second end of the nut capable of receiving a thrust from the mechanical actuator, and a second end of the screw passing through the piston in leaktight fashion in order to be subjected to atmospheric pressure and having a tapered shoulder capable of being selectively rotationally blocked by an internal tapered, rotationally fixed surface of the piston against which the shoulder is pressed with a force which increases with the pressure of the hydraulic fluid, characterized in that the mechanical actuator comprises two plates capable of relative rotation, the first plate fastened securely to the second end of the elongate nut, and the second plate connected to a spindle passing through the body in leaktight fashion.

2. The brake motor according to claim 1, characterized in that said spindle of the second plate is hollow.

\* \* \* \* \*